US 9,459,931 B2

(12) United States Patent
Archer et al.

(10) Patent No.: US 9,459,931 B2
(45) Date of Patent: *Oct. 4, 2016

(54) ADMINISTERING A LOCK FOR RESOURCES IN A DISTRIBUTED COMPUTING ENVIRONMENT

(71) Applicant: International Business Machines Corporation, Armonk, NY (US)

(72) Inventors: Charles J. Archer, Hillsboro, OR (US); Tsai-Yang Jea, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/148,176

(22) Filed: Jan. 6, 2014

(65) Prior Publication Data
US 2015/0193277 A1 Jul. 9, 2015

(51) Int. Cl.
G06F 9/46 (2006.01)
G06F 9/52 (2006.01)

(52) U.S. Cl.
CPC ....................... *G06F 9/52* (2013.01)

(58) Field of Classification Search
None
See application file for complete search history.

(56) References Cited

U.S. PATENT DOCUMENTS

| | | | | |
|---|---|---|---|---|
| 6,247,025 | B1 * | 6/2001 | Bacon | G06F 17/30362 |
| 6,742,135 | B1 * | 5/2004 | Wu | 714/4.1 |
| 6,757,769 | B1 * | 6/2004 | Ofer | 710/200 |
| 7,487,153 | B2 | 2/2009 | Makhervaks et al. | |
| 8,510,334 | B2 * | 8/2013 | Chan et al. | 707/781 |
| 2003/0018785 | A1 * | 1/2003 | Eshel et al. | 709/226 |
| 2003/0097360 | A1 * | 5/2003 | McGuire et al. | 707/8 |
| 2003/0145210 | A1 * | 7/2003 | Taylor | 713/182 |
| 2004/0019639 | A1 * | 1/2004 | E et al. | 709/205 |
| 2004/0059818 | A1 * | 3/2004 | Snyder et al. | 709/226 |
| 2005/0114609 | A1 * | 5/2005 | Shorb | 711/152 |
| 2005/0155011 | A1 * | 7/2005 | Heik et al. | 717/100 |
| 2006/0015700 | A1 * | 1/2006 | Burka | G06F 9/526 711/163 |
| 2006/0129556 | A1 * | 6/2006 | Reuter | 707/8 |
| 2007/0094669 | A1 * | 4/2007 | Rector et al. | 718/104 |
| 2008/0109807 | A1 * | 5/2008 | Rosenbluth | 718/102 |
| 2008/0126812 | A1 * | 5/2008 | Ahmed et al. | 713/189 |
| 2009/0328041 | A1 * | 12/2009 | Sudzilouski | 718/100 |
| 2010/0146122 | A1 * | 6/2010 | Prince, Jr. | G06F 9/5083 709/226 |
| 2011/0131193 | A1 * | 6/2011 | Pasupuleti et al. | 707/704 |
| 2011/0202748 | A1 * | 8/2011 | Jacobi | G06F 9/3004 712/205 |
| 2014/0365549 | A1 * | 12/2014 | Jenkins | 709/201 |
| 2015/0235683 | A1 * | 8/2015 | Song | G11C 7/1093 365/189.05 |

OTHER PUBLICATIONS

Narravula, S., et al., "High Performance Distributed Lock Management Services using Network-based Remote Atomic Operations", In proceeding of: Seventh IEEE International Symposium on Cluster Computing and the Grid (CCGrid 2007), May 14-17, 2007, Rio de Janeiro, Brazil, pp. 1-8, IEEE Computer Society, Washington, DC, USA. URL: http://nowlab.cse.ohio-state.edu/publications/conf-papers/2007/narravul-ccgrid07.pdf.

* cited by examiner

*Primary Examiner* — Diem Cao
(74) *Attorney, Agent, or Firm* — Brandon C. Kennedy; Feb Cabrasawan; Kennedy Lenart Spraggins LLP

(57) ABSTRACT

In a distributed computing environment that includes compute nodes, where the compute nodes execute a plurality of tasks, a lock for resources may be administered. Administering the lock may be carried out by requesting, in an atomic operation by a requesting task, the lock, including: determining, by the requesting task, whether the lock is available; if the lock is available, obtaining the lock; and if the lock is unavailable, joining, by the requesting task, a queue of tasks waiting for availability of the lock.

10 Claims, 9 Drawing Sheets

ADMINISTERING A LOCK FOR RESOURCES IN A DISTRIBUTED COMPUTING ENVIRONMENT

BACKGROUND OF THE INVENTION

1. Field of the Invention

The field of the invention is data processing, or, more specifically, methods, apparatus, and products for administering a lock for resources in a distributed computing environment.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Computer systems today may be employed in distributed computing environments, such as massively parallel computers, in which many computer systems are coupled for data communications and utilized together for additional computational bandwidth. In such a distributed computing environment, tasks of the computer system may share resources, such as memory, input/output (I/O), and the like. Controlling the availability and use of the shared resources among many tasks is often carried out through use of a lock. Locks, today, however, are administered in such a way that can result in a task chasing the lock forever without ever (or at least for an appreciable amount of time) being able to obtain the lock. That is, locks in today's distributed computing environment are often implemented in an unfair manner between tasks in the environment.

SUMMARY OF THE INVENTION

Methods, apparatus, and products for administering a lock for resources in a distributed computing environment are disclosed in this specification. The distributed computing environment includes a plurality of compute nodes, with the compute nodes executing a plurality of tasks. In such an environment, a lock may be administered by: requesting, in an atomic operation by a requesting task, a lock, including: determining, by the requesting task, whether the lock is available; if the lock is available, obtaining the lock; and if the lock is unavailable, joining, by the requesting task, a queue of tasks waiting for availability of the lock.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
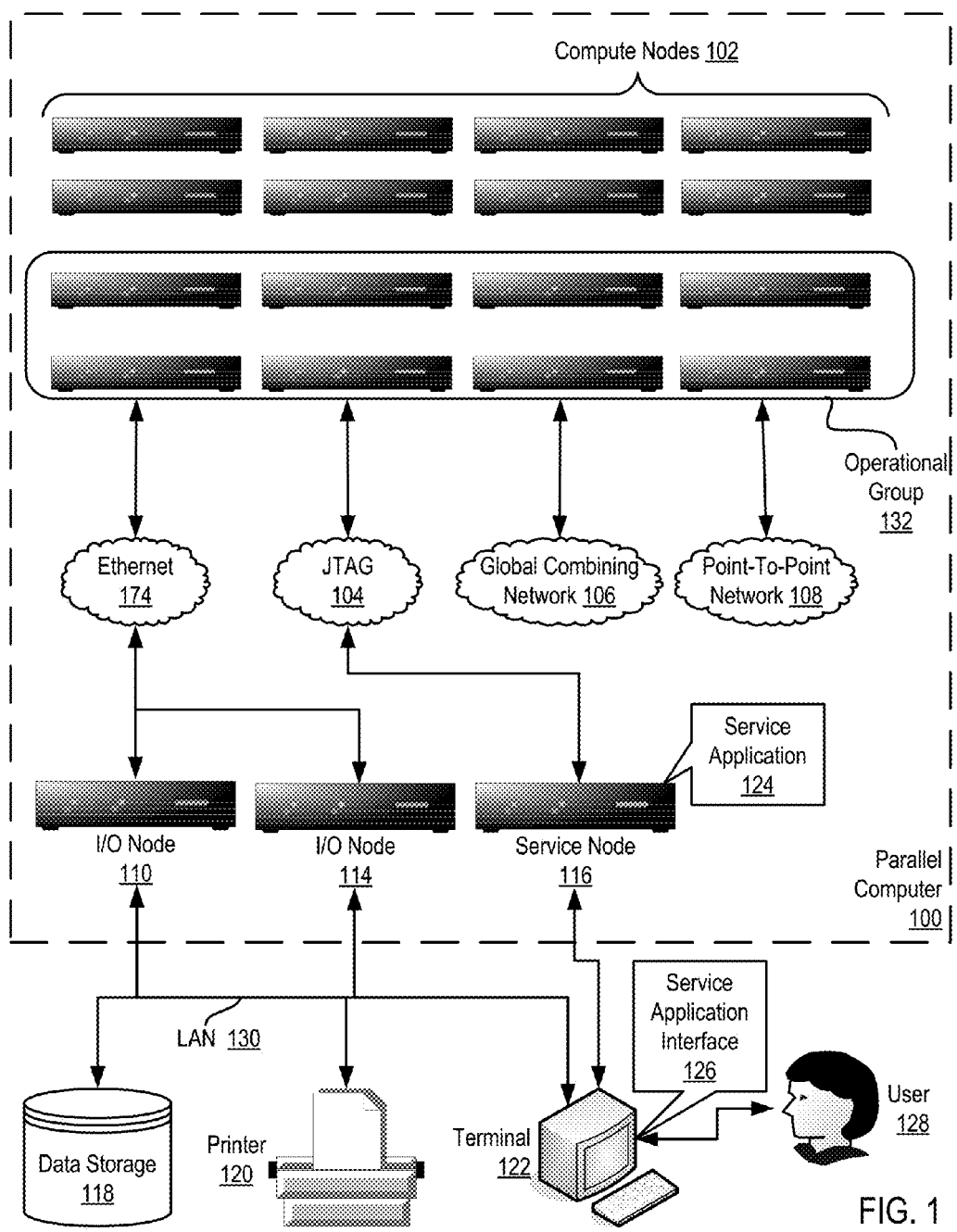
FIG. 1 illustrates an exemplary system for administering a lock for resources in a distributed computing environment according to embodiments of the present invention.

Exemplary methods, apparatus, and products for administering a lock for resources in a distributed computing environment in accordance with the present invention are described with reference to the accompanying drawings, beginning with FIG. 1. One example of a distributed computing environment for which a lock for resources may be administered in accordance with embodiments of the present invention is a parallel computer. Parallel computing is the simultaneous execution of the same task (split up and specially adapted) on multiple processors in order to obtain results faster. Parallel computing is based on the fact that the process of solving a problem usually can be divided into smaller tasks, which may be carried out simultaneously with some coordination.

Parallel computers execute parallel algorithms. A parallel algorithm can be split up to be executed a piece at a time on many different processing devices, and then put back together again at the end to get a data processing result. Some algorithms are easy to divide up into pieces. Splitting up the job of checking all of the numbers from one to a hundred thousand to see which are primes could be done, for example, by assigning a subset of the numbers to each available processor, and then putting the list of positive results back together. In this specification, the multiple processing devices that execute the individual pieces of a parallel program are referred to as 'compute nodes.' A parallel computer is composed of compute nodes and other processing nodes as well, including, for example, input/output ('I/O') nodes, and service nodes.

Parallel algorithms are valuable because it is faster to perform some kinds of large computing tasks via a parallel algorithm than it is via a serial (non-parallel) algorithm, because of the way modern processors work. It is far more difficult to construct a computer with a single fast processor than one with many slow processors with the same throughput. There are also certain theoretical limits to the potential speed of serial processors. On the other hand, every parallel algorithm has a serial part and so parallel algorithms have a saturation point. After that point adding more processors does not yield any more throughput but only increases the overhead and cost.

Parallel algorithms are designed also to optimize one more resource the data communications requirements among the nodes of a parallel computer. There are two ways parallel processors communicate, shared memory or message passing. Shared memory processing needs additional locking for the data and imposes the overhead of additional processor and bus cycles and also serializes some portion of the algorithm.

Message passing processing uses high-speed data communications networks and message buffers, but this communication adds transfer overhead on the data communications networks as well as additional memory need for message buffers and latency in the data communications among nodes. Designs of parallel computers use specially designed data communications links so that the communication overhead will be small but it is the parallel algorithm that decides the volume of the traffic.

Many data communications network architectures are used for message passing among nodes in parallel computers. Compute nodes may be organized in a network as a 'torus' or 'mesh,' for example. Also, compute nodes may be organized in a network as a tree. A torus network connects the nodes in a three-dimensional mesh with wrap around links. Every node is connected to its six neighbors through this torus network, and each node is addressed by its x,y,z coordinate in the mesh. In such a manner, a torus network lends itself to point to point operations. In a tree network, the nodes typically are connected into a binary tree: each node has a parent, and two children (although some nodes may only have zero children or one child, depending on the hardware configuration). Although a tree network typically is inefficient in point to point communication, a tree network does provide high bandwidth and low latency for certain collective operations, message passing operations where all compute nodes participate simultaneously, such as, for example, an allgather operation. In computers that use a torus and a tree network, the two networks typically are implemented independently of one another, with separate routing circuits, separate physical links, and separate message buffers.

In some parallel computers, each compute node may execute one or more tasks—a process of execution for a parallel application. Each task may include a number of endpoints. Each endpoint is a data communications endpoint that supports communications among many other endpoints and tasks. In this way, endpoints support collective operations in a parallel computer by supporting the underlying message passing responsibilities carried out during a collective operation. In some parallel computers, each compute node may execute a single task including a single endpoint. For example, a parallel computer that operates with the Message Passing Interface ('MPI') described below in more detail may execute a single rank on each compute node of the parallel computer. In such implementations, the terms task, endpoint, and rank are effectively synonymous.

FIG. 1 illustrates an exemplary system for administering a lock for resources in a distributed computing environment according to embodiments of the present invention. The system of FIG. 1 includes a parallel computer (100), non-volatile memory for the computer in the form of a data storage device (118), an output device for the computer in the form of a printer (120), and an input/output device for the computer in the form of a computer terminal (122).

The parallel computer (100) in the example of FIG. 1 includes a plurality of compute nodes (102). The compute nodes (102) are coupled for data communications by several independent data communications networks including a high speed Ethernet network (174), a Joint Test Action Group ('JTAG') network (104), a global combining network (106) which is optimized for collective operations using a binary tree network topology, and a point-to-point network (108), which is optimized for point-to-point operations using a torus network topology. The global combining network (106) is a data communications network that includes data communications links connected to the compute nodes (102) so as to organize the compute nodes (102) as a binary tree. Each data communications network is implemented with data communications links among the compute nodes (102). The data communications links provide data communications for parallel operations among the compute nodes (102) of the parallel computer (100).

The compute nodes (102) of the parallel computer (100) are organized into at least one operational group (132) of compute nodes for collective parallel operations on the parallel computer (100). Each operational group (132) of compute nodes is the set of compute nodes upon which a collective parallel operation executes. Each compute node in the operational group (132) is assigned a unique rank that identifies the particular compute node in the operational group (132). Collective operations are implemented with data communications among the compute nodes of an operational group. Collective operations are those functions that involve all the compute nodes of an operational group (132). A collective operation is an operation, a message-passing computer program instruction that is executed simultaneously, that is, at approximately the same time, by all the compute nodes in an operational group (132) of compute nodes. Such an operational group (132) may include all the compute nodes (102) in a parallel computer (100) or a subset all the compute nodes (102). Collective operations are often built around point-to-point operations. A collective operation requires that all processes on all compute nodes within an operational group (132) call the same collective operation with matching arguments. A 'broadcast' is an example of a collective operation for moving data among compute nodes of an operational group. A 'reduce' operation is an example of a collective operation that executes arithmetic or logical functions on data distributed among the compute nodes of an operational group (132). An operational group (132) may be implemented as, for example, an MPI 'communicator.'

'MPI' refers to 'Message Passing Interface,' a prior art parallel communications library, a module of computer program instructions for data communications on parallel computers. Examples of prior-art parallel communications libraries that may be improved for use in systems configured according to embodiments of the present invention include MPI and the 'Parallel Virtual Machine' ('PVM') library. PVM was developed by the University of Tennessee, The Oak Ridge National Laboratory and Emory University. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Some collective operations have a single originating or receiving process running on a particular compute node in an operational group (132). For example, in a 'broadcast' collective operation, the process on the compute node that distributes the data to all the other compute nodes is an originating process. In a 'gather' operation, for example, the process on the compute node that received all the data from the other compute nodes is a receiving process. The compute node on which such an originating or receiving process runs is referred to as a logical root.

Most collective operations are variations or combinations of four basic operations: broadcast, gather, scatter, and reduce. The interfaces for these collective operations are defined in the MPI standards promulgated by the MPI Forum. Algorithms for executing collective operations, however, are not defined in the MPI standards. In a broadcast operation, all processes specify the same root process, whose buffer contents will be sent. Processes other than the root specify receive buffers. After the operation, all buffers contain the message from the root process.

A scatter operation, like the broadcast operation, is also a one-to-many collective operation. In a scatter operation, the logical root divides data on the root into segments and distributes a different segment to each compute node in the operational group (132). In scatter operation, all processes typically specify the same receive count. The send arguments are only significant to the root process, whose buffer actually contains sendcount * N elements of a given datatype, where N is the number of processes in the given group of compute nodes. The send buffer is divided and dispersed to all processes (including the process on the logical root). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked compute nodes into a receive buffer in a root node.

A reduction operation is also a many-to-one collective operation that includes an arithmetic or logical function performed on two data elements. All processes specify the same 'count' and the same arithmetic or logical function. After the reduction, all processes have sent count data elements from compute node send buffers to the root process. In a reduction operation, data elements from corresponding send buffer locations are combined pair-wise by arithmetic or logical operations to yield a single corresponding element in the root process' receive buffer. Application specific reduction operations can be defined at runtime. Parallel communications libraries may support predefined operations. MPI, for example, provides the following predefined reduction operations:

MPI_MAX maximum
MPI_MIN minimum
MPI_SUM sum
MPI_PROD product
MPI_LAND logical and
MPI_BAND bitwise and
MPI_LOR logical or
MPI_BOR bitwise or
MPI_LXOR logical exclusive or
MPI_BXOR bitwise exclusive or In addition to compute nodes, the parallel computer (100) includes input/output ('I/O') nodes (110, 114) coupled to compute nodes (102) through the global combining network (106). The compute nodes (102) in the parallel computer (100) may be partitioned into processing sets such that each compute node in a processing set is connected for data communications to the same I/O node. Each processing set, therefore, is composed of one I/O node and a subset of compute nodes (102). The ratio between the number of compute nodes to the number of I/O nodes in the entire system typically depends on the hardware configuration for the parallel computer (102). For example, in some configurations, each processing set may be composed of eight compute nodes and one I/O node. In some other configurations, each processing set may be composed of sixty-four compute nodes and one I/O node. Such example are for explanation only, however, and not for limitation. Each I/O node provides I/O services between compute nodes (102) of its processing set and a set of I/O devices. In the example of FIG. 1, the I/O nodes (110, 114) are connected for data communications I/O devices (118, 120, 122) through local area network ('LAN') (130) implemented using high-speed Ethernet.

The parallel computer (100) of FIG. 1 also includes a service node (116) coupled to the compute nodes through one of the networks (104). Service node (116) provides services common to pluralities of compute nodes, administering the configuration of compute nodes, loading programs into the compute nodes, starting program execution on the compute nodes, retrieving results of program operations on the compute nodes, and so on. Service node (116) runs a service application (124) and communicates with users (128) through a service application interface (126) that runs on computer terminal (122).

The parallel computer (100) of FIG. 1 operates generally for administering a lock for resources in a distributed computing environment in accordance with embodiments of the present invention. A lock may be utilized to control access to a variety of resources in the parallel computer of FIG. 1. Examples of such resources may include network resources, storage resources, memory resources, I/O resources, processing resources, co-processing resources, software resources, and the like.

In the example of FIG. 1, each of the compute nodes (102) may execute one or more tasks and one of the tasks—referred to here as a requesting task—may request, in an atomic operation, a lock. An atomic operation is an operation that will always be executed without any other process being able to read or change state that is read or changed during the operation. Atomic operations can operate to reduce or eliminate race conditions. The atomic operation, in this example, enables a requesting task to attempt to obtain a lock, without another task interrupting that attempt. As part of the atomic operation, the requesting tasks may determine whether the lock is available and if the lock is available, obtaining the lock. If the lock is unavailable, the requesting task joins a queue of tasks waiting for availability of the lock.

Administering a lock for resources in a distributed computing environment according to embodiments of the present invention is generally implemented on a parallel computer that includes a plurality of compute nodes organized for collective operations through at least one data communications network. In fact, such computers may include thousands of such compute nodes. Each compute node is in turn itself a kind of computer composed of one or more computer processing cores, its own computer memory, and its own input/output adapters. For further explanation, therefore, FIG. 2 sets forth a block diagram of an example compute node (102) useful in a parallel computer capable of administering a lock for resources in a distributed computing environment according to embodiments of the present invention. The compute node (102) of FIG. 2 includes a plurality of processing cores (165) as well as RAM (156). The processing cores (165) of FIG. 2 may be configured on one or more integrated circuit dies. Processing cores (165) are connected to RAM (156) through a high-speed memory bus (155) and through a bus adapter (194) and an extension bus (168) to other components of the compute node. Stored in RAM (156) is an application program (159), a module of computer program instructions that carries out parallel, user-level data processing using parallel algorithms.

Also stored RAM (156) is a parallel communications library (161), a library of computer program instructions that carry out parallel communications among compute nodes, including point-to-point operations as well as collective operations. A library of parallel communications routines may be developed from scratch for use in systems according to embodiments of the present invention, using a traditional programming language such as the C programming language, and using traditional programming methods to write parallel communications routines that send and receive data among nodes on two independent data communications networks. Alternatively, existing prior art libraries may be improved to operate according to embodiments of the present invention. Examples of prior-art parallel communications libraries include the 'Message Passing Interface' ('MPI') library and the 'Parallel Virtual Machine' ('PVM') library.

Also stored in RAM (156) are a number of tasks (226) executing on the compute node (102). A task may be a process, thread of execution, or other instantiation of a parallel application or operating system executed in the parallel computer. A method of administering a lock for resources in a distributed computing environment that includes the compute node (102) of FIG. 2 which executes a number of tasks (226), includes: requesting, in an atomic operation by a requesting task, a lock (228). The requesting task may be one of the tasks (226) executing on the compute node (102) of FIG. 2. As part of the atomic operation, the requesting task may determine, by the requesting task, whether the lock is available. If the lock is available, the requesting task obtains the lock and, if the lock is unavailable, the requesting task joins a queue (230) of tasks waiting for availability of the lock.

The atomic operations described above may be effected with one or more RDMA (Remote Direct Memory Access) operations. To that end, the compute node in the example of FIG. 2 includes a DMA controller (195) and a DMA engine (197). The DMA controller (195) is a module of logic circuitry configured to accept DMA instructions and operate a DMA engine (197) to carry them out. The DMA engine (197) is a module of automated computing machinery that implements, through communications with other DMA engines on other compute nodes, direct memory access to and from memory on its own compute node and memory on other the compute nodes. Direct memory access is a way of reading and writing to memory of compute nodes with reduced operational burden on the central processing units (165). A CPU (165) initiates a DMA transfer, but the CPU does not execute the DMA transfer. A DMA transfer essentially copies a block of memory from one compute node to another, from an origin to a target for a PUT operation, from a target to an origin for a GET operation.

Also stored in RAM (156) is an operating system (162), a module of computer program instructions and routines for an application program's access to other resources of the compute node. It is typical for an application program and parallel communications library in a compute node of a parallel computer to run a single thread of execution with no user login and no security issues because the thread is entitled to complete access to all resources of the node. The quantity and complexity of tasks to be performed by an operating system on a compute node in a parallel computer therefore are smaller and less complex than those of an operating system on a serial computer with many threads running simultaneously. In addition, there is no video I/O on the compute node (102) of FIG. 2, another factor that decreases the demands on the operating system. The operating system (162) may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Windows XP™, AIX™, IBM's i5/OS™, and others as will occur to those of skill in the art.

Figure 2:
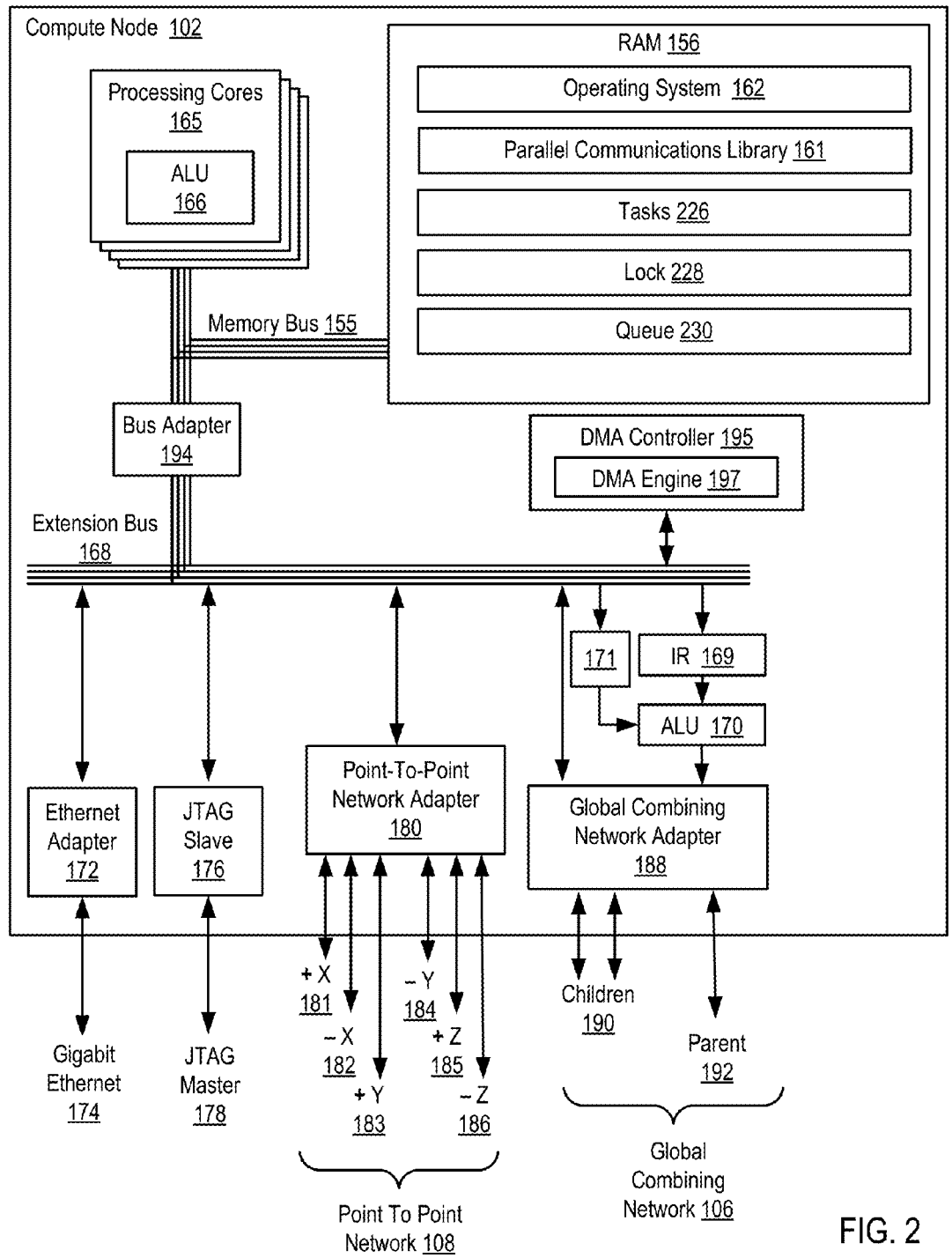
FIG. 2 sets forth a block diagram of an example compute node useful in a parallel computer capable of administering a lock for resources in a distributed computing environment according to embodiments of the present invention.

The example compute node (102) of FIG. 2 includes several communications adapters (172, 176, 180, 188) for implementing data communications with other nodes of a parallel computer. Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful in apparatus useful for administering a lock for resources in a distributed computing environment include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (102) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 include a JTAG Slave circuit (176) that couples example compute node (102) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient alternative access point into the system. The example compute node of FIG. 2 may be all three of these: It typically includes one or more integrated circuits installed on a printed circuit board and may be implemented as an embedded system having its own processing core, its own memory, and its own I/O capability. JTAG boundary scans through JTAG Slave (176) may efficiently configure processing core registers and memory in compute node (102).

The data communications adapters in the example of FIG. 2 include a Point-To-Point Network Adapter (180) that couples example compute node (102) for data communications to a network (108) that is optimal for point-to-point message passing operations such as, for example, a network configured as a three-dimensional torus or mesh. The Point-To-Point Adapter (180) provides data communications in six directions on three communications axes, x, y, and z, through six bidirectional links: +x (181), −x (182), +y (183), −y (184), +z (185), and −z (186).

The data communications adapters in the example of FIG. 2 include a Global Combining Network Adapter (188) that couples example compute node (102) for data communications to a global combining network (106) that is optimal for collective message passing operations such as, for example, a network configured as a binary tree. The Global Combining Network Adapter (188) provides data communications through three bidirectional links for each global combining network (106) that the Global Combining Network Adapter (188) supports. In the example of FIG. 2, the Global Combining Network Adapter (188) provides data communications through three bidirectional links for global combining network (106): two to children nodes (190) and one to a parent node (192).

The example compute node (102) includes multiple arithmetic logic units ('ALUs'). Each processing core (165) includes an ALU (166), and a separate ALU (170) is dedicated to the exclusive use of the Global Combining Network Adapter (188) for use in performing the arithmetic and logical functions of reduction operations, including an allreduce operation. Computer program instructions of a reduction routine in a parallel communications library (161) may latch an instruction for an arithmetic or logical function into an instruction register (169). When the arithmetic or logical function of a reduction operation is a 'sum' or a 'logical OR,' for example, the collective operations adapter (188) may execute the arithmetic or logical operation by use of the ALU (166) in the processing core (165) or, typically much faster, by use of the dedicated ALU (170) using data provided by the nodes (190, 192) on the global combining network (106) and data provided by processing cores (165) on the compute node (102).

Often when performing arithmetic operations in the global combining network adapter (188), however, the global combining network adapter (188) only serves to combine data received from the children nodes (190) and pass the result up the network (106) to the parent node (192). Similarly, the global combining network adapter (188) may only serve to transmit data received from the parent node (192) and pass the data down the network (106) to the children nodes (190). That is, none of the processing cores (165) on the compute node (102) contribute data that alters the output of ALU (170), which is then passed up or down the global combining network (106). Because the ALU (170) typically does not output any data onto the network (106) until the ALU (170) receives input from one of the processing cores (165), a processing core (165) may inject the identity element into the dedicated ALU (170) for the particular arithmetic operation being perform in the ALU (170) in order to prevent alteration of the output of the ALU (170). Injecting the identity element into the ALU, however, often consumes numerous processing cycles. To further enhance performance in such cases, the example compute node (102) includes dedicated hardware (171) for injecting identity elements into the ALU (170) to reduce the amount of processing core resources required to prevent alteration of the ALU output. The dedicated hardware (171) injects an identity element that corresponds to the particular arithmetic operation performed by the ALU. For example, when the global combining network adapter (188) performs a bitwise OR on the data received from the children nodes (190), dedicated hardware (171) may inject zeros into the ALU (170) to improve performance throughout the global combining network (106).

Figure 3:
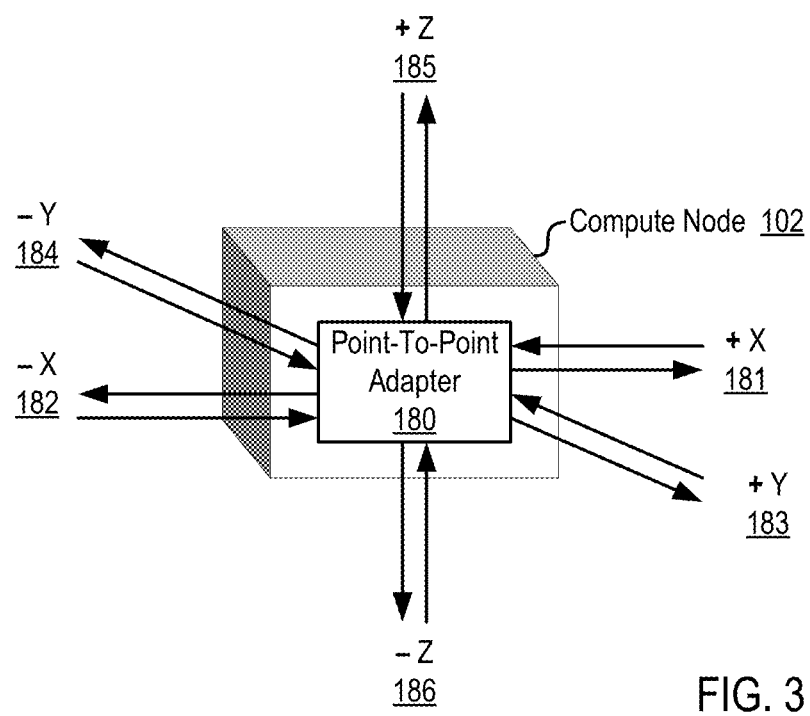
FIG. 3 sets forth a block diagram of an example Point-To-Point Adapter useful in systems for administering a lock for resources in a distributed computing environment according to embodiments of the present invention.

For further explanation, FIG. 3 sets forth a block diagram of an example Point-To-Point Adapter (180) useful in systems for administering a lock for resources in a distributed computing environment according to embodiments of the present invention. The Point-To-Point Adapter (180) is designed for use in a data communications network optimized for point-to-point operations, a network that organizes compute nodes in a three-dimensional torus or mesh. The Point-To-Point Adapter (180) in the example of FIG. 3 provides data communication along an x-axis through four unidirectional data communications links, to and from the next node in the −x direction (182) and to and from the next node in the +x direction (181). The Point-To-Point Adapter (180) of FIG. 3 also provides data communication along a y-axis through four unidirectional data communications links, to and from the next node in the −y direction (184) and to and from the next node in the +y direction (183). The Point-To-Point Adapter (180) of FIG. 3 also provides data communication along a z-axis through four unidirectional data communications links, to and from the next node in the −z direction (186) and to and from the next node in the +z direction (185).

Figure 4:
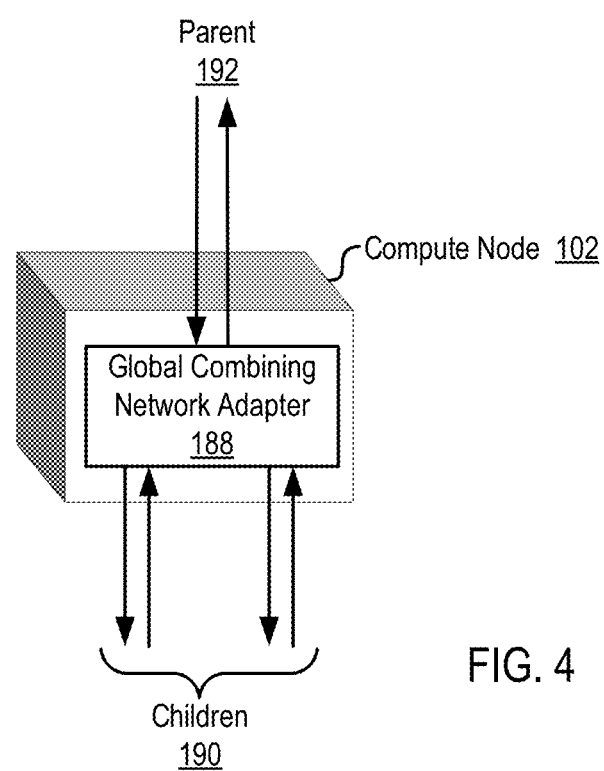
FIG. 4 sets forth a block diagram of an example Global Combining Network Adapter useful in systems for administering a lock for resources in a distributed computing environment according to embodiments of the present invention.

For further explanation, FIG. 4 sets forth a block diagram of an example Global Combining Network Adapter (188) useful in systems for administering a lock for resources in a distributed computing environment according to embodiments of the present invention. The Global Combining Network Adapter (188) is designed for use in a network optimized for collective operations, a network that organizes compute nodes of a parallel computer in a binary tree. The Global Combining Network Adapter (188) in the example of FIG. 4 provides data communication to and from children nodes of a global combining network through four unidirectional data communications links (190), and also provides data communication to and from a parent node of the global combining network through two unidirectional data communications links (192).

Figure 5:
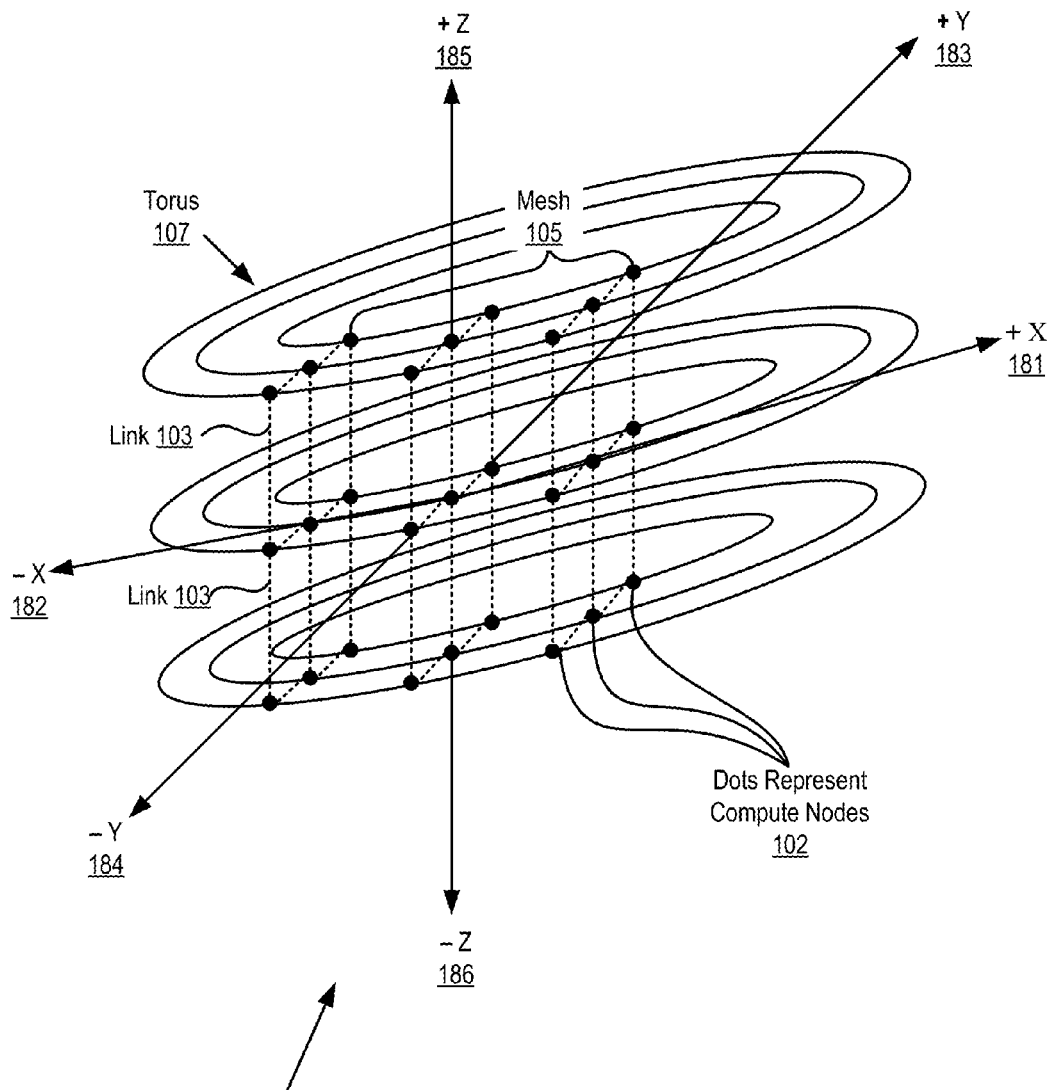
FIG. 5 sets forth a line drawing illustrating an example data communications network optimized for point-to-point operations useful in systems capable of administering a lock for resources in a distributed computing environment according to embodiments of the present invention.

For further explanation, FIG. 5 sets forth a line drawing illustrating an example data communications network (108) optimized for point-to-point operations useful in systems capable of administering a lock for resources in a distributed computing environment according to embodiments of the present invention. In the example of FIG. 5, dots represent compute nodes (102) of a parallel computer, and the dotted lines between the dots represent data communications links (103) between compute nodes. The data communications links are implemented with point-to-point data communications adapters similar to the one illustrated for example in FIG. 3, with data communications links on three axis, x, y, and z, and to and fro in six directions +x (181), −x (182), +y (183), −y (184), +z (185), and −z (186). The links and compute nodes are organized by this data communications network optimized for point-to-point operations into a three dimensional mesh (105). The mesh (105) has wrap-around links on each axis that connect the outermost compute nodes in the mesh (105) on opposite sides of the mesh (105). These wrap-around links form a torus (107). Each compute node in the torus has a location in the torus that is uniquely specified by a set of x, y, z coordinates. Readers will note that the wrap-around links in the y and z directions have been omitted for clarity, but are configured in a similar manner to the wrap-around link illustrated in the x direction. For clarity of explanation, the data communications network of FIG. 5 is illustrated with only 27 compute nodes, but readers will recognize that a data communications network optimized for point-to-point operations for use in administering a lock for resources in a distributed computing environment in accordance with embodiments of the present invention may contain only a few compute nodes or may contain thousands of compute nodes. For ease of explanation, the data communications network of FIG. 5 is illustrated with only three dimensions, but readers will recognize that a data communications network optimized for point-to-point operations for use in administering a lock for resources in a distributed computing environment in accordance with embodiments of the present invention may in facet be implemented in two dimensions, four dimensions, five dimensions, and so on. Several supercomputers now use five dimensional mesh or torus networks, including, for example, IBM's Blue Gene Q™.

Figure 6:
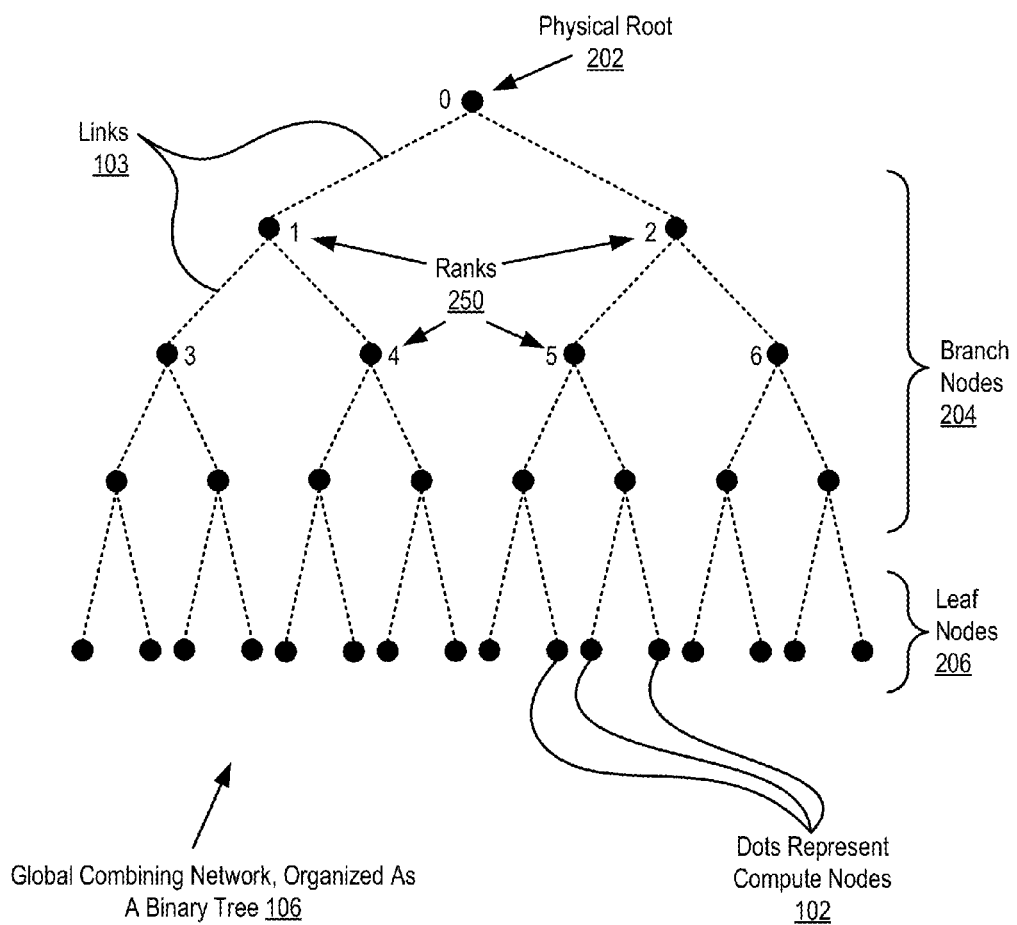
FIG. 6 sets forth a line drawing illustrating an example global combining network useful in systems capable of administering a lock for resources in a distributed computing environment according to embodiments of the present invention.

For further explanation, FIG. 6 sets forth a line drawing illustrating an example global combining network (106) useful in systems capable of administering a lock for resources in a distributed computing environment according to embodiments of the present invention. The example data communications network of FIG. 6 includes data communications links (103) connected to the compute nodes so as to organize the compute nodes as a tree. In the example of FIG. 6, dots represent compute nodes (102) of a parallel computer, and the dotted lines (103) between the dots represent data communications links between compute nodes. The data communications links are implemented with global combining network adapters similar to the one illustrated for example in FIG. 4, with each node typically providing data communications to and from two children nodes and data communications to and from a parent node, with some exceptions. Nodes in the global combining network (106) may be characterized as a physical root node (202), branch nodes (204), and leaf nodes (206). The physical root (202) has two children but no parent and is so called because the physical root node (202) is the node physically configured at the top of the binary tree. The leaf nodes (206) each has a parent, but leaf nodes have no children. The branch nodes (204) each has both a parent and two children. The links and compute nodes are thereby organized by this data communications network optimized for collective operations into a binary tree (106). For clarity of explanation, the data communications network of FIG. 6 is illustrated with only 31 compute nodes, but readers will recognize that a global combining network (106) optimized for collective operations for use in administering a lock for resources in a distributed computing environment in accordance with embodiments of the present invention may contain only a few compute nodes or may contain thousands of compute nodes.

In the example of FIG. 6, each node in the tree is assigned a unit identifier referred to as a 'rank' (250). The rank actually identifies a task or process that is executing a parallel operation according to embodiments of the present invention. Using the rank to identify a node assumes that only one such task is executing on each node. To the extent that more than one participating task executes on a single node, the rank identifies the task as such rather than the node. A rank uniquely identifies a task's location in the tree network for use in both point-to-point and collective operations in the tree network. The ranks in this example are assigned as integers beginning with 0 assigned to the root tasks or root node (202), 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank.

Figure 7:
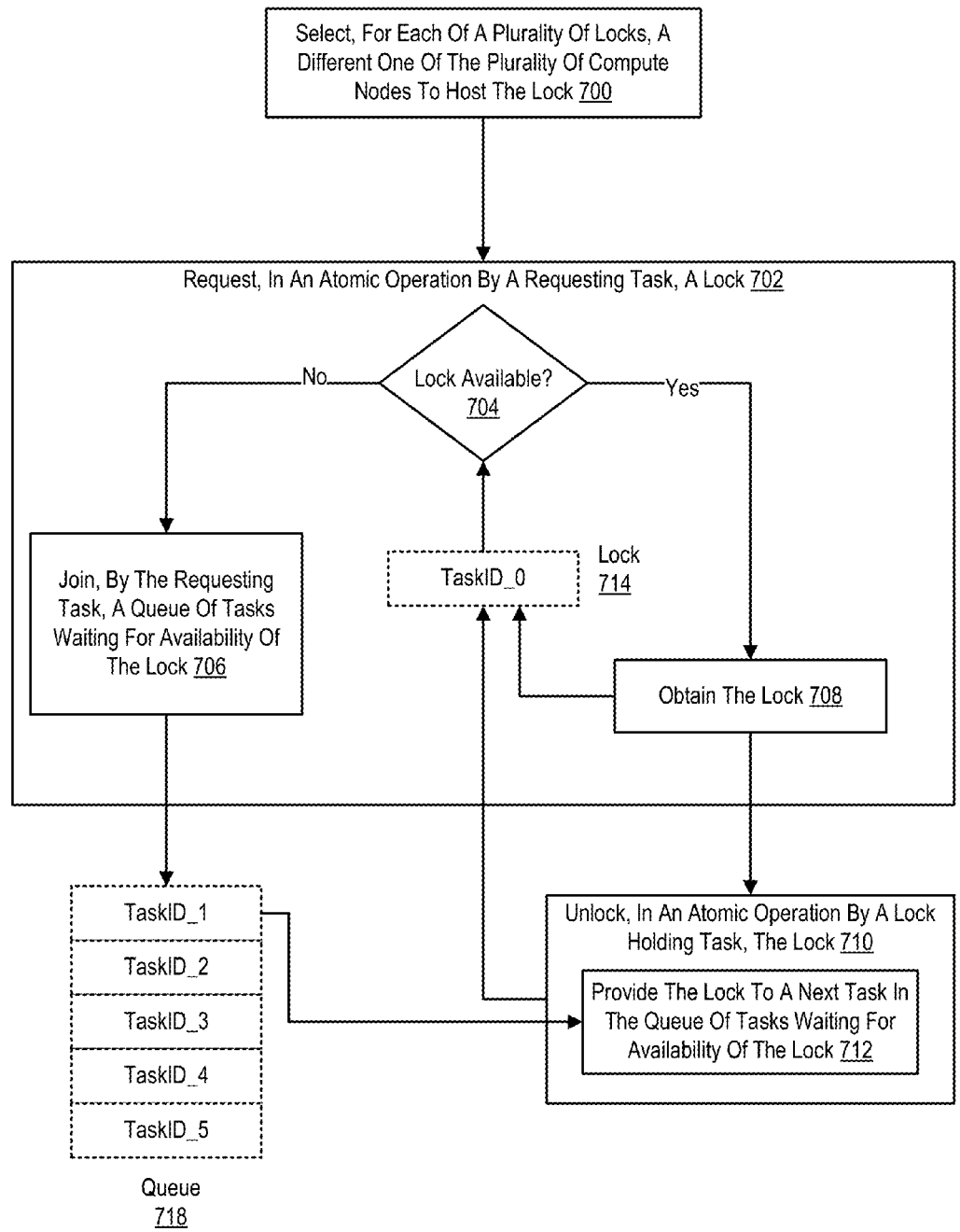
FIG. 7 sets forth a flow chart illustrating an example method for administering a lock for resources in a distributed computing environment according to embodiments of the present invention.

For further explanation, FIG. 7 sets forth a flow chart illustrating an example method administering a lock for resources in a distributed computing environment according to embodiments of the present invention. The distributed computing environment in which the method of FIG. 7 is carried out may be similar to the example parallel computer (100) of FIG. 1 which includes a number of compute nodes (102, with each compute node executing a plurality of tasks.

The method of FIG. 7 includes selecting (700), for each of a plurality of locks, a different one of the plurality of compute nodes to host the lock. That is, each lock may be hosted by a different compute node. In this way, the burden of hosting the locks is distributed amongst the compute nodes, rather than being centralized in one compute node. Selecting (700) a compute node to host a lock may be carried out in a variety of ways including selecting a compute node in dependence upon a set of selection criteria. The selection criteria may specify an address or other identifier of a compute node to be selected for each lock, may specify that only a compute node with a particular workload less than a predefined threshold be selected, that a compute node with particular communication abilities be selected, that a compute node with particular memory availability be selected, that a compute node with some other hardware or software capabilities be selected, and so on.

The method of FIG. 7 also includes requesting (702), in an atomic operation by a requesting task, a lock (714). The lock may be implemented as a memory location that includes either a predefined value representing the lock is available or an identifier of a task currently holding the lock.

In the example of FIG. 7, requesting (702) the lock is carried out by determining (704), by the requesting task, whether the lock is available. Determining (704) whether the lock is available is available may be carried out by determining whether a task identifier is stored in the memory location of the lock or whether a predefined value representing availability of the lock is stored in the memory location of the lock.

If the lock is available, the method of FIG. 7 continues by obtaining (708), by the requesting task, the lock (708). Obtaining (708) the lock may be carried out by storing, in the memory location of the lock (714), the identifier of the requesting task.

If the lock is unavailable, the method of FIG. 7 continues by joining (706), by the requesting task, a queue (718) of tasks waiting for availability of the lock (714). Joining (706) a queue (718) of tasks waiting for availability of the lock (714) may be carried out by storing in a next available element of the queue, the identifier of the request task.

The method of FIG. 7 also includes unlocking (710), in an atomic operation by a lock holding task, the lock (714). In the method of FIG. 7, unlocking (710) the lock (714) may be carried out by removing the lock holding task's identifier from the lock's (714) memory location and providing (712) the lock to a next task in the queue (718) of tasks waiting for availability of the lock. Providing (712) the lock to a next task in the queue of tasks waiting for availability of the lock may be carried out by, replacing, in the memory location of the lock (714), the lock holding task's identifier with the identifier of the next task's in the queue. Then, the lock hold tasks (having released the lock) may notify the next tasks of the change.

Figure 8:
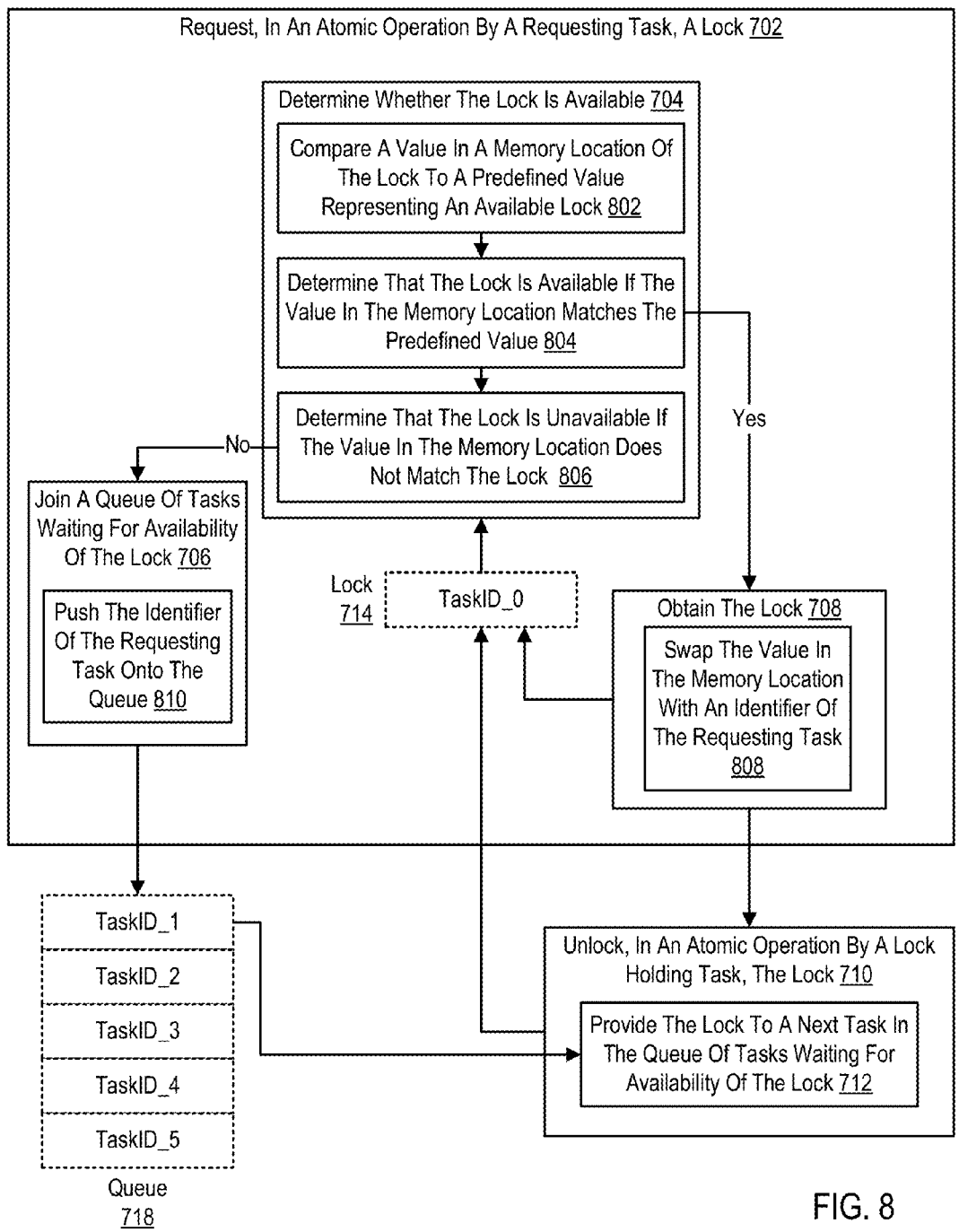
FIG. 8 sets forth a flow chart illustrating another example method for administering a lock for resources in a distributed computing environment according to embodiments of the present invention.

FIG. 8 sets forth a flow chart illustrating another example method for administering a lock for resources in a distributed computing environment according to embodiments of the present invention. The method of FIG. 8 is similar to the method of FIG. 7 in that the method of FIG. 8 may also be carried out in a distributed computing environment that includes a number of compute nodes where each node executes one or more tasks. The method of FIG. 8 is also similar to the method of FIG. 7 in that the method of FIG. 8 also includes: requesting (702) a lock (714), including: determining (704) whether the lock is available; obtaining (708) the lock if the lock is available; and joining (706) a queue (718) of tasks waiting for availability of the lock if the lock is unavailable.

The method of FIG. 8 differs from the method of FIG. 7, however, in that determining (704) whether the lock is available includes comparing (802) a value in a memory location of the lock (714) to a predefined value representing an available lock, determining (804) that the lock (714) is available if the value in the memory location matches the predefined value, and determining (806) that the lock is unavailable if the value in the memory location does not match the lock.

In the method of FIG. 8, obtaining (708) the lock (714) includes swapping (808) the value in the memory location of the lock (714) with an identifier of the requesting task. Also in the method of FIG. 8, joining (706) a queue of tasks waiting for availability of the lock is carried out by pushing (810) the identifier of the requesting task onto the queue.

In the method of FIG. 8, the memory location of the lock (714) and the queue may be an object allocated in memory space shared by the each of tasks. An example of an API that provides interfaces for applications to manipulate and access shared memory space includes SHMEM™ API from SGI. When allocated in memory shared memory space, swapping (808) the value in the memory location with the identifier of the requesting task and pushing (810) the identifier of the requesting task onto the queue may be carried out by atomic RDMA (Remote Direct Memory Access) operations. That is, in embodiments of the present invention, RDMA may be utilized to administer the lock (714) and queue (718), further reducing the burden on the compute node (102) hosting the lock (714).

Figure 9:
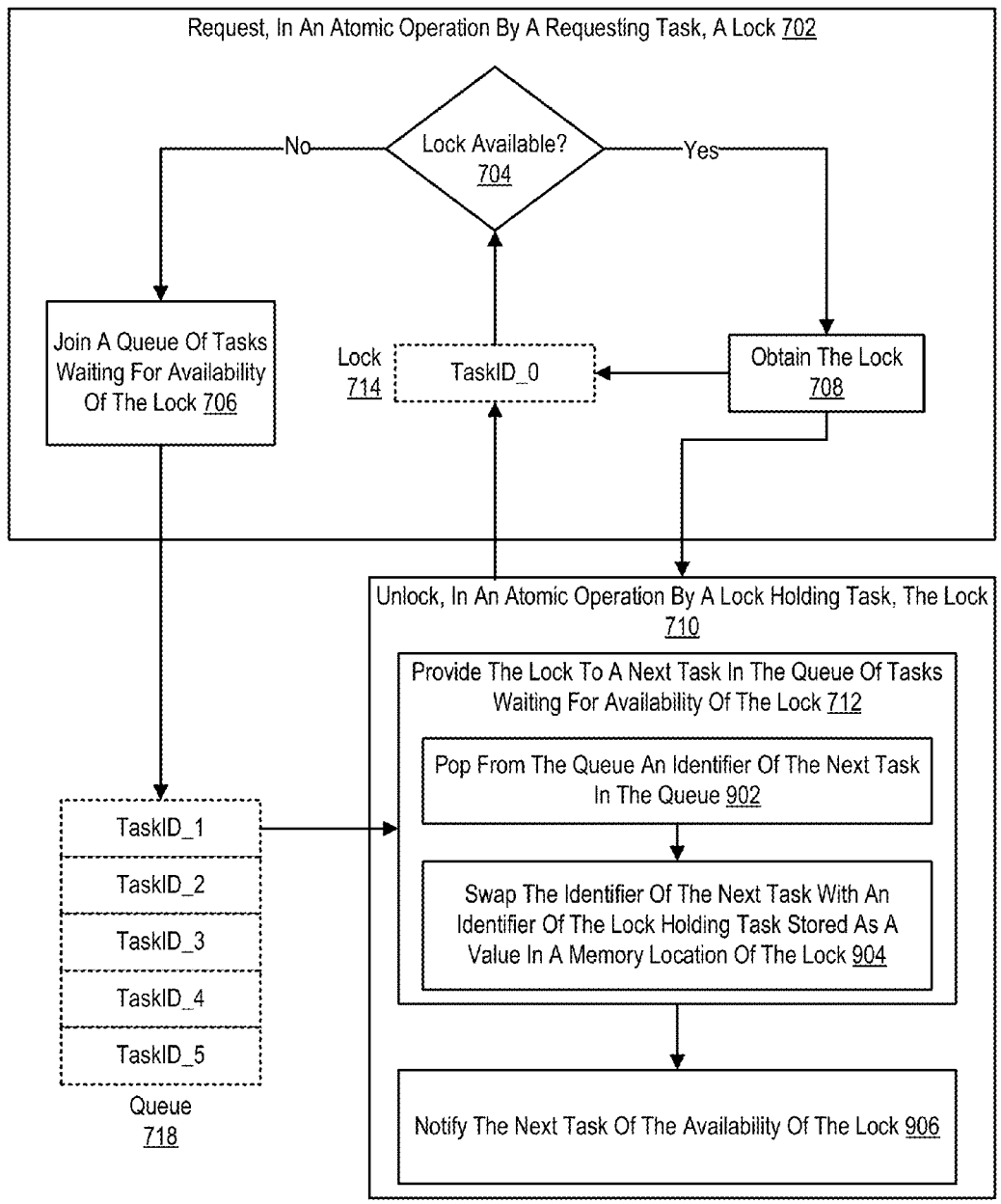
FIG. 9 sets forth a flow chart illustrating another example method for administering a lock for resources in a distributed computing environment according to embodiments of the present invention.

FIG. 9 sets forth a flow chart illustrating another example method for administering a lock for resources in a distributed computing environment according to embodiments of the present invention. The method of FIG. 9 is similar to the method of FIG. 7 in that the method of FIG. 9 may also be carried out in a distributed computing environment that includes a number of compute nodes where each node executes one or more tasks. The method of FIG. 9 is also similar to the method of FIG. 7 in that the method of FIG. 9 also includes: requesting (702) a lock (714), including: determining (704) whether the lock is available; obtaining (708) the lock if the lock is available; and joining (706) a queue (718) of tasks waiting for availability of the lock if the lock is unavailable.

The method of FIG. 9 differs from the method of FIG. 7, however, in that in the method of FIG. 9, unlocking (710) the lock includes notifying (906) the next task of the availability of the lock. Notifying the next task may be carried out by the task unlocking the lock or by a DMA engine or controller through RDMA operations.

Also in the method of FIG. 9, providing (712) the lock to the next task in the queue of tasks waiting for availability of the lock is carried out by: popping (902) from the queue (702) an identifier of the next task in the queue and swapping (904) the identifier of the next task with an identifier of the lock holding task stored as a value in a memory location of the lock.

In the method of FIG. 9, the queue and memory location of the lock (714) may be objects allocated in memory shared by the plurality of tasks. In this way, popping (902) the identifier of the next task from the queue and swapping (904) the identifier of the next task with the identifier of the lock holding task stored as a value in a memory location of the lock may be carried out by one or more atomic RDMA operations.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable transmission medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable transmission medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable transmission medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. An apparatus for administering a plurality of locks for resources in a distributed computing environment comprising a plurality of compute nodes organized as a tree network, the compute nodes executing a plurality of tasks, the apparatus comprising a computer processor, a computer memory operatively coupled to the computer processor, the computer memory having disposed within it computer program instructions that, when executed by the computer processor, cause the apparatus to carry out the steps of:

selecting, for each of the plurality of locks in dependence upon a set of selection criteria, a different one of the plurality of computer notes to host one of the plurality of locks;

requesting, in a single atomic operation by a requesting task, a lock of the plurality of locks, including:

determining whether the lock is available including determining whether a particular memory location includes a value indicating that the lock is available;

responsive to determining that the particular memory location includes the value indicating that the lock is available, obtaining the lock including swapping within the particular memory location, the value indicating the lock is available with an identifier of a location in the tree network associated with the requesting task; and responsive to determining that the particular memory location does not include the value indicating that the lock is available, joining a queue of tasks waiting for availability of the lock.

2. The apparatus of claim 1, further comprising:

determining that the lock is unavailable if the value in the particular memory location does not match the value indicating that the lock is available; and joining a queue of tasks waiting for availability of the lock further comprises pushing the identifier of the requesting task onto the queue.

3. The apparatus of claim 2, wherein swapping within the particular memory location, the value indicating the lock is available with an identifier of the requesting task and pushing the identifier of the requesting task onto the queue further comprises one or more atomic RDMA (Remote Direct Memory Access) operations.

4. The apparatus of claim 2, wherein each of the particular memory location and the queue comprises an object allocated in memory space shared by the plurality of tasks.

5. The apparatus of claim 1, further comprising computer program instructions that, when executed by the computer processor, cause the apparatus to carry out the steps of unlocking, in a single atomic operation by a lock holding task, the lock, including providing the lock to a next task in the queue of tasks waiting for availability of the lock.

6. The apparatus of claim 5, wherein unlocking the lock further comprises notifying the next task of the availability of the lock.

7. The apparatus of claim 5, wherein providing the lock to the next task in the queue of tasks waiting for availability of the lock further comprises:
   popping from the queue an identifier of a location in the tree network associated with the next task in the queue; and
   swapping the identifier of the next task with an identifier of a location in the tree network associated with the lock holding task stored as a value in a memory location of the lock.

8. The apparatus of claim 7, wherein popping the identifier of the next task from the queue and swapping the identifier of the next task with the identifier of the lock holding task stored as a value in a memory location of the lock further comprises one or more atomic RDMA (Remote Direct Memory Access) operations.

9. A computer program product for administering a plurality of locks for resources in a distributed computing environment comprising a plurality of compute nodes organized as a tree network, the compute nodes executing a plurality of tasks, the computer program product disposed upon a non-transitory computer readable medium, the computer program product comprising computer program instructions that, when executed, cause a computer to carry out the steps of:

selecting, for each of the plurality of locks in dependence upon a set of selection criteria, a different one of the plurality of compute nodes to host one of the plurality of locks;

requesting, in a single atomic operation by a requesting task, a lock of the plurality of locks, including:

determining whether the lock is available including determining whether a particular memory location includes a value indicating that the lock is available;

responsive to determining that the particular memory location includes the value indicating that the lock is available, obtaining the lock including swapping within the particular memory location, the value indicating the lock is available with an identifier of a location in the tree network associated with the requesting task; and responsive to determining that the particular memory location does not include the value indicating that the lock is available, joining a queue of tasks waiting for availability of the lock.

10. The computer program product of claim 9, wherein:

determining whether the lock is available further comprises determining that the lock is unavailable if the value in the particular memory location does not match the value indicating that the lock is available; and joining a queue of tasks waiting for availability of the lock further comprises pushing the identifier of the requesting task onto the queue.

* * * * *